(12) United States Patent
Singh et al.

(10) Patent No.: US 11,178,151 B2
(45) Date of Patent: Nov. 16, 2021

(54) DECENTRALIZED DATABASE IDENTITY MANAGEMENT SYSTEM

(71) Applicant: International Business Machines Corporation, Armonk, NY (US)

(72) Inventors: Kapil Kumar Singh, Cary, NC (US); Suresh N. Chari, Yorktown Heights, NY (US); Ashish Kundu, Yorktown Heights, NY (US); Sridhar Muppidi, Austin, TX (US); Dong Su, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 16/226,336

(22) Filed: Dec. 19, 2018

(65) Prior Publication Data
US 2020/0204557 A1   Jun. 25, 2020

(51) Int. Cl.
| | | |
|---|---|---|
| *H04L 29/00* | (2006.01) | |
| *H04L 29/06* | (2006.01) | |
| *H04L 29/08* | (2006.01) | |
| *G06F 16/335* | (2019.01) | |
| *H04L 9/06* | (2006.01) | |
| *G06F 21/57* | (2013.01) | |

(52) U.S. Cl.
CPC .......... *H04L 63/102* (2013.01); *G06F 16/337* (2019.01); *G06F 21/577* (2013.01); *H04L 9/0637* (2013.01); *H04L 67/306* (2013.01); *H04L 2209/38* (2013.01)

(58) Field of Classification Search
CPC ... H04L 63/102; H04L 67/306; H04L 9/0637; H04L 2209/38; G06F 16/337; G06F 21/577
See application file for complete search history.

(56) References Cited

U.S. PATENT DOCUMENTS

| | | | |
|---|---|---|---|
| 7,350,237 B2 | 3/2008 | Vogel et al. | |
| 8,955,057 B2 | 2/2015 | Desai et al. | |
| 9,672,499 B2 * | 6/2017 | Yang | G06Q 20/065 |
| 10,348,505 B1 * | 7/2019 | Crawforth | H04L 9/3236 |
| 10,425,230 B1 * | 9/2019 | Tang | H04L 9/0894 |
| 10,637,665 B1 * | 4/2020 | Sundaresan | G06Q 20/4012 |
| 10,708,042 B1 * | 7/2020 | Rubenstein | H04L 67/1097 |
| 10,713,737 B1 * | 7/2020 | Blackburn | G06Q 50/08 |
| 2005/0120352 A1 | 6/2005 | Subramaniam | |

(Continued)

OTHER PUBLICATIONS

W. Abramowicz et al.; "Architecture for Web services filtering and clustering"; Poznan University of Economics; Second International Conference on Internet and Web Applications and Services; IEEE; 2007.

*Primary Examiner* — Don G Zhao

(57) ABSTRACT

An example operation may include one or more of receiving, by a blockchain node or peer of a blockchain network, attribute data for a user profile, creating blockchain transactions to store attribute hashes and metadata to a shared ledger, receiving a user profile query from an identity consumer, creating blockchain transactions to retrieve attribute hashes and metadata corresponding to the query, reconstructing the user profile from the metadata, responding to the query by providing attribute data to the identity consumer, and creating and storing hashes of the attribute data and metadata to the shared ledger.

17 Claims, 14 Drawing Sheets

(56) References Cited

U.S. PATENT DOCUMENTS

| | | |
|---|---|---|
| 2005/0132228 A1 | 6/2005 | Ende |
| 2012/0174194 A1 | 7/2012 | Furukawa |
| 2016/0232527 A1 | 8/2016 | Patterson |
| 2017/0103167 A1* | 4/2017 | Shah ................... G16H 10/60 |
| 2017/0134162 A1* | 5/2017 | Code ................... G06F 21/10 |
| 2017/0250972 A1* | 8/2017 | Ronda ................. H04L 9/3236 |
| 2017/0295023 A1* | 10/2017 | Madhavan ........... H04L 9/3247 |
| 2018/0005186 A1* | 1/2018 | Hunn ................... G06F 40/103 |
| 2018/0018723 A1* | 1/2018 | Nagla .................. H04L 63/08 |
| 2018/0068130 A1* | 3/2018 | Chan ................... G06F 21/64 |
| 2018/0121635 A1* | 5/2018 | Tormasov ............ H04L 9/3297 |
| 2018/0137218 A1* | 5/2018 | Subramaniyan ...... G06F 30/20 |
| 2018/0248699 A1* | 8/2018 | Andrade .............. H04L 9/0897 |
| 2018/0285879 A1* | 10/2018 | Gadnis ................ G06F 16/1805 |
| 2018/0341648 A1* | 11/2018 | Kakavand ............ G06Q 50/18 |
| 2018/0343120 A1* | 11/2018 | Andrade .............. H04L 9/0866 |
| 2019/0130399 A1* | 5/2019 | Wright ................. G06Q 20/065 |
| 2019/0155997 A1* | 5/2019 | Vos ...................... G06F 21/105 |
| 2019/0180371 A1* | 6/2019 | Benkert ............... H04L 9/3263 |
| 2019/0220831 A1* | 7/2019 | Rangarajan .......... H04L 9/3066 |
| 2019/0228086 A1* | 7/2019 | Bordens ............... G06F 21/64 |
| 2019/0253431 A1* | 8/2019 | Atanda ................ H04L 63/105 |
| 2019/0306549 A1* | 10/2019 | Dietz ................... H04N 21/251 |
| 2019/0319808 A1* | 10/2019 | Fallah .................. H04L 9/30 |
| 2019/0340362 A1* | 11/2019 | Wright ................ H04L 63/0823 |
| 2019/0372755 A1* | 12/2019 | Tadie ................... G06Q 20/382 |
| 2019/0378152 A1* | 12/2019 | Zhang .................. G06Q 20/06 |
| 2019/0384932 A1* | 12/2019 | Pratt .................... H04L 9/3239 |
| 2019/0386969 A1* | 12/2019 | Verzun ................ H04L 63/102 |
| 2020/0013053 A1* | 1/2020 | Amin ................... H04L 63/10 |
| 2020/0014691 A1* | 1/2020 | Ortiz ................... H04L 63/10 |
| 2020/0044485 A1* | 2/2020 | Smith .................. H02J 50/50 |
| 2020/0090208 A1* | 3/2020 | Reichenbach ........ G06Q 40/08 |
| 2020/0098072 A1* | 3/2020 | Escobar ............... G06Q 20/389 |
| 2020/0103894 A1* | 4/2020 | Cella ................... H04B 17/309 |
| 2020/0104819 A1* | 4/2020 | Garcia ................. G06Q 20/0655 |
| 2020/0106735 A1* | 4/2020 | Guerrieri ............. H04L 51/36 |
| 2020/0118131 A1* | 4/2020 | Diriye ................. G06Q 20/4016 |
| 2020/0137045 A1* | 4/2020 | Aiello ................. H04L 63/0876 |
| 2020/0177386 A1* | 6/2020 | Mahmood ........... H04L 9/3239 |

\* cited by examiner

DECENTRALIZED DATABASE IDENTITY MANAGEMENT SYSTEM

TECHNICAL FIELD

This application generally relates to a database storage system, and more particularly, to a decentralized database identity management system.

BACKGROUND

A centralized database stores and maintains data in one single database (e.g., database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

However, a centralized database suffers from significant drawbacks. For example, a centralized database has a single point of failure. In particular, if there are no fault-tolerance considerations and a hardware failure occurs (for example a hardware, firmware, and/or a software failure), all data within the database is lost and work of all users is interrupted. In addition, centralized databases are highly dependent on network connectivity. As a result, the slower the connection, the amount of time needed for each database access is increased. Another drawback is the occurrence of bottlenecks when a centralized database experiences high traffic due to a single location. Furthermore, a centralized database provides limited access to data because only one copy of the data is maintained by the database. As a result, multiple devices cannot access the same piece of data at the same time without creating significant problems or risk overwriting stored data. Furthermore, because a database storage system has minimal to no data redundancy, data that is unexpectedly lost is very difficult to retrieve other than through manual operation from back-up storage.

Conventionally, a centralized database is limited by centralized user attribute control and approval, which makes such a system vulnerable to tampering. As such, what is needed is a solution to overcome these significant drawbacks.

SUMMARY

One example embodiment provides a system that includes one or more external stores and a blockchain network. The blockchain network includes one or more attribute custodians, an identity consumer, and a smart contract or chaincode. The one or more attribute custodians are configured to receive attribute data for a user profile from the one or more external stores and create blockchain transactions to store hashes of the attribute data and metadata to the shared ledger. The identity consumer is configured to create a blockchain transaction to query one or more attributes of the user profile and receive the one or more attributes of the user profile. The smart contract or chaincode, in response to the blockchain transaction to query the one or more attributes, is configured to retrieve attribute hashes and metadata corresponding to the query, reconstruct the user profile from the metadata, respond to the query by providing attribute data to the identity consumer, and create and store hashes of the attribute data and metadata to the shared ledger.

Another example embodiment provides a method that includes one or more of receiving, by a blockchain node or peer of a blockchain network, attribute data for a user profile, creating blockchain transactions to store attribute hashes and metadata to a shared ledger, receiving a user profile query from an identity consumer, creating blockchain transactions to retrieve attribute hashes and metadata corresponding to the query, reconstructing the user profile from the metadata, responding to the query by providing attribute data to the identity consumer, and creating and storing hashes of the attribute data and metadata to the shared ledger.

A further example embodiment provides a non-transitory computer readable medium comprising instructions, that when read by a processor, cause the processor to perform one or more of receiving, by a blockchain node or peer of a blockchain network, attribute data for a user profile, creating blockchain transactions to store attribute hashes and metadata to a shared ledger, receiving a user profile query from an identity consumer, creating blockchain transactions to retrieve attribute hashes and metadata corresponding to the query, reconstructing the user profile from the metadata, responding to the query by providing attribute data to the identity consumer, and creating and storing hashes of the attribute data and metadata to the shared ledger.

DETAILED DESCRIPTION

Figure 1:
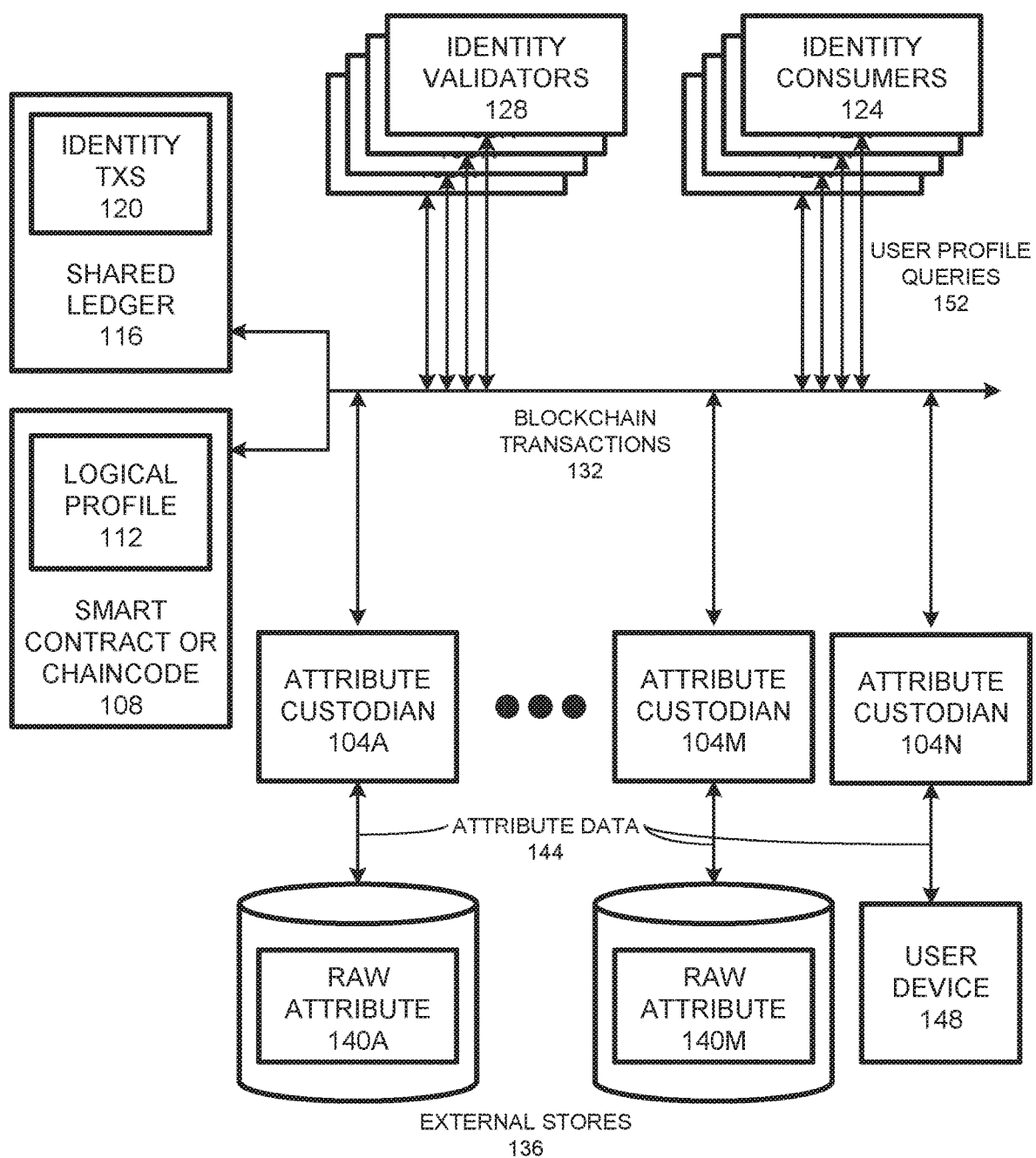
FIG. 1 illustrates a logic network diagram of an identity management blockchain network, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide a device-based blockchain system.

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In a public or permission-less blockchain, anyone can participate without a specific identity. Public blockchains often involve native cryptocurrency and use consensus based on various protocols such as Proof of Work (PoW). On the other hand, a permissioned blockchain database provides a system which can secure inter-actions among a group of entities which share a common goal but which do not fully trust one another, such as businesses that exchange funds, goods, information, and the like.

A blockchain operates arbitrary, programmable logic, tailored to a decentralized storage scheme and referred to as "smart contracts" or "chaincodes." In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement or endorsement policy. In general, blockchain transactions typically must be "endorsed" before being committed to the blockchain while transactions which are not endorsed are disregarded. A typical endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Today, users build one-on-one trust relationships with every type of service provider. These result in repetition of identity validation tasks for all involved parties, further resulting in wasted resources and increased risks. Decentralized trust formation, where a common user identity is developed and used by all services, promises many benefits in reducing wasted efforts and overall costs.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, smart contracts, privacy, decentralization, and accountability, and the like, which are further described herein. According to various aspects, the invention provides a new solution where a gap previously existed by enabling a blockchain-based logical profile that allows multiple actors to contribute (and own) user data in their own systems of record while tracking all data modifications through blockchain transactions.

In particular, with respect to immutability/accountability, the present application allows for accountability for changes (e.g. user attributes cannot be modified out-of-band without making an explicit transaction for data modification).

With respect to smart contracts/chaincodes, the concept of logical profiles described herein may be implemented as a smart contract or chaincode in the blockchain (e.g. Hyperledger Fabric blockchain networks). Any operations on the logical profile (CRUD) are ledgered as transactions on the blockchain.

With respect to distributed or decentralized operation, the solution also follows distributed control as there is no single party that owns and controls all the attributes of a user's profile. Any entity that creates the attribute should have control over it.

With respect to privacy, all data accesses are driven by privacy policies and consent management that also drives the anonymity protocols for sharing data. Moreover, no raw data is stored on-chain and off-chain systems of records are managed by attribute owners, enabling owner-controlled privacy of those attributes.

One of the benefits of the example embodiments is that it improves how identity data is stored and managed. The identity data (user attributes) are stored at multiple databases (i.e., systems of record) that are managed and maintained by data owners. Only the identity transactions and metadata (data hash, location, etc.) is stored on-chain in the shared ledger. Through the blockchain system described herein, a computing system can improve on how identity data can be aggregated from multiple sources while tracking modifications.

The example embodiments provide numerous benefits over a traditional database.

Although portions of the methods of the present application can possibly be implemented on a traditional database, however, it would not provide the same distributed trust guarantees. In such a case, the middleman entity that records the transactions (updates to the identity attributes) would need to be trusted. Moreover, such an entity would become a centralized bottleneck for potential failures and attacks.

The example embodiments also change how data may be stored within a block structure of the blockchain. For example, metadata related to identity attributes is stored on the blockchain. This includes, but is not limited to: user ID, hash of the data, location of the raw data, owner contact (and other info), etc. This information is stored in the data section of the block and these entries are made using the identity solution-specific smart contract. No traditional data needs to be removed from the data blocks—the invention does not change the underlying blockchain in any way and instead builds an identity application using smart contracts or chaincode.

The present application addresses how multiple parties may collaborate, own, and control access to attributes to user identity profiles, and seamlessly carry out profile queries without any single source of central control. The present application addresses the problem by providing decentralized user profiles over blockchain-based infrastructures where user profile information is logically aggregated from multiple Systems of Record (SoR) that are administered by various participants of a blockchain network. The attributes of the profile are stored in multiple external stores and are access-controlled by privacy and consent policies.

FIG. 1 illustrates a logic network diagram of an identity management blockchain network, according to example embodiments. Referring to FIG. 1, the network 100 includes a plurality of nodes or peers that cooperate to manage user profiles. Identity providers (and consumers) such as banks want to leverage the benefits of decentralized user profiles, while at the same time reduce cost by engaging with a unified view of such profiles. Multiple entities should be able to contribute attributes and other value-added services to user profiles. There should be no single party that owns and controls all the attributes of a user's profile. Any entity that creates the attribute should have control over it, as well. The present invention builds a logical view of user profiles on a blockchain based on attributes aggregated from multiple Systems of Record.

The network 100 may be a public or a permissioned blockchain network, such as a Hyperledger Fabric or Ethereum network. The network 100 includes a plurality of attribute custodians 104, shown as attribute custodians 104A through 104M, and 104N. The attribute custodians 104 are nodes or peers that act as attribute owners. Attribute owners have control over one or more specific attributes that are part of user profiles.

Attributes may include any information including, but not limited to a name, an address, a social security number, a country, an account number, or a document relating to a user profile.

Each attribute custodian 104 stores one or more raw attributes 140 it is responsible for in one or more external stores 136, outside the blockchain network 100. FIG. 1 illustrates M external stores 136, identified as an external store 136 storing raw attributes 140A for attribute custodian 104A through another external store 136 storing raw attributes 140M for attribute custodian 104M. The identity attributes are stored in the external stores 136 that are administered by the owners of the attributes. The attribute owners may grant temporary or permanent access to the attributes on demand, or can refuse access.

The attribute custodians 104 can pull (consume) or push (contribute) data from/to the logical profile 112 using blockchain queries/invokes 152 that inherently translate access to the external stores 136 (with appropriate consent and policy management). Multiple storage options may be linked to the logical profile 112 and are independently managed by the attribute custodians 104. All data accesses are driven by privacy policies and consent management that also drives the anonymity protocols for sharing data. The logical profile 112 may be stored by the blockchain nodes in the shared ledger 116 and managed through the smart contract or chaincode 108, via application programming interfaces (APIs). Any changes would be made through the API calls to the smart contract or chaincode 108. Within this process, metadata would be added/updated into the shared ledger 116 by the smart contract or chaincode 108.

An attribute custodian 104N may also be associated with a user device 148 and corresponding user. The external stores 136 and user device 148 provide attribute data 144 to the attribute custodians 104. In this way, a user may contribute attribute data 144, such as personal characteristics, likes, or dislikes to a user profile corresponding to the user. The attributes may be stored on the user's device 148, on external stores 136 (such as cloud storage), or immutable ledgers 116 of the blockchain network 100.

Various participants into the identity blockchain network 100, users, and attribute custodians 104 (e.g. banks), are onboarded (blockchain identities created) into the network 100. Each user registers into the identity system and creates a logical persona using chaincode invoke/query calls. The user also creates and manages an external attribute store 136 (e.g. Dropbox, Cloudant, etc.) This may be done using an application (at user device 148) or using a trusted web service. The attributes are stored in user's external store 136, while metadata (hash of the attribute, pointer to external location) is stored in a logical profile 112.

An attribute custodian 104 (e.g. a bank) may add additional attributes to a user's profile using chaincode 108 invoke calls, where the logical profile 112 will only contain metadata, while the attribute is stored in a custodian-managed external store 136. The data owner (user of user device 148 or attribute custodians 104) always maintains control of attributes and can optionally delete or revoke access. However, they cannot modify the attribute without an explicit update transaction though the blockchain network 100.

Attribute owners or custodians 104 always have control over the raw attributes 140, however, they cannot maliciously modify the attributes.

Blockchain network 100 also includes one or more identity consumers 124, which make use of user profiles for various reasons—including but not limited to ecommerce transactions, security-related transactions, customer interaction, and so forth. In some embodiments, an identity consumer 124 may also be an attribute custodian 104, such as a bank that provides an account number as attribute data 144 to a user profile and also provides credit or lending services to the user. Identity consumers 124 may query for specific attributes from an attribute custodian 104, be granted explicit access to external stores 136, and can validate the attribute against the shared ledger 116 hash value.

Blockchain network 100 also includes one or more identity validators 128, which validate identity-related blockchain transactions 132.

Identity-related transactions 132, whether to create a new user profile, modify an existing profile, or delete an existing user profile, are stored as identity transactions 120 in a shared ledger 116 of the blockchain. Thus, all transactions are immutable using blockchain technology and may be audited at any time.

Blockchain network 100 also includes smart contracts or chaincodes 108, which include a logical profile 112. Various entities may contribute attributes to user profiles, however, the raw attributes 140 are never stored as part of the profile on the blockchain. The logical profile 112 instead contains metadata (e.g. hash, and link to the external data) of the raw attributes 140. Any operations on the logical profile 112, which include create logical profile 112, read logical profile 112, update logical profile 112, and delete logical profile 112 are ledgered as transactions on the blockchain. In Hyperledger Fabric networks, an identity network is established with chaincode 108 that implements various operations on the logical profile 112. The chaincode 108 also implements (specifies and enforces) access control and consent requirements of the data owner (attribute custodian 104).

Figure 2A:
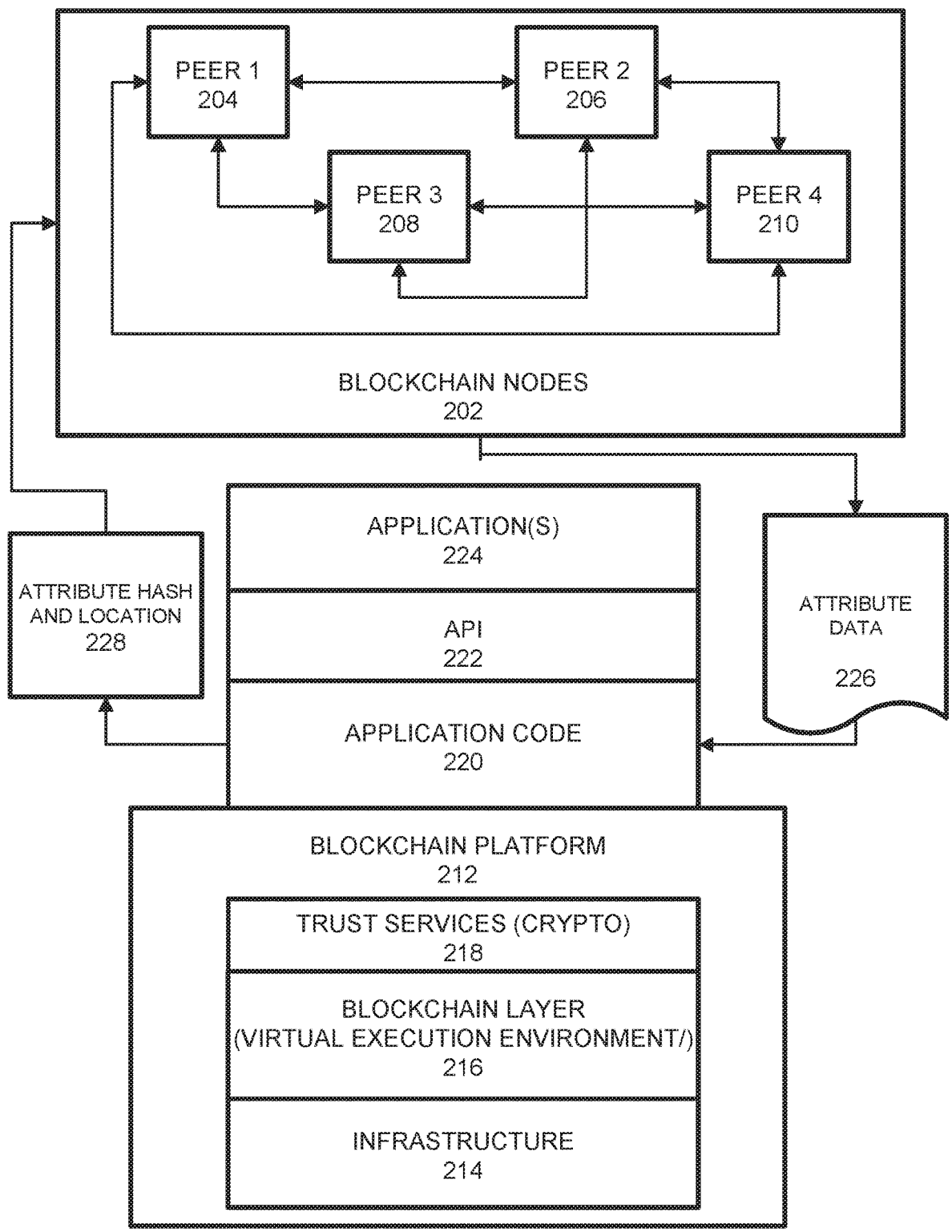
FIG. 2A illustrates an example peer node configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a nonlimiting example, smart contracts may be created to execute reminders, updates, and/or other notifications subject to the changes, updates, etc. The smart contracts can themselves be used to identify rules associated with authorization and access requirements and usage of the ledger. For example, the information 226 may include various component transactions such as a request to replace a component of the vehicle 100 or change a driver to a transferee 158. Component transactions 226 may be processed by one or more processing entities (e.g., virtual machines) included in the blockchain layer 216. The result 228 may include a request for component authorization. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, a blockchain platform 212 may receive attribute data 226 for either a new attribute or a modified attribute from an attribute owner. One function may be to request an attribute hash and metadata 228, including a location of an external store 136, which may be provided to one or more of the nodes 204-210.

Figure 2B:
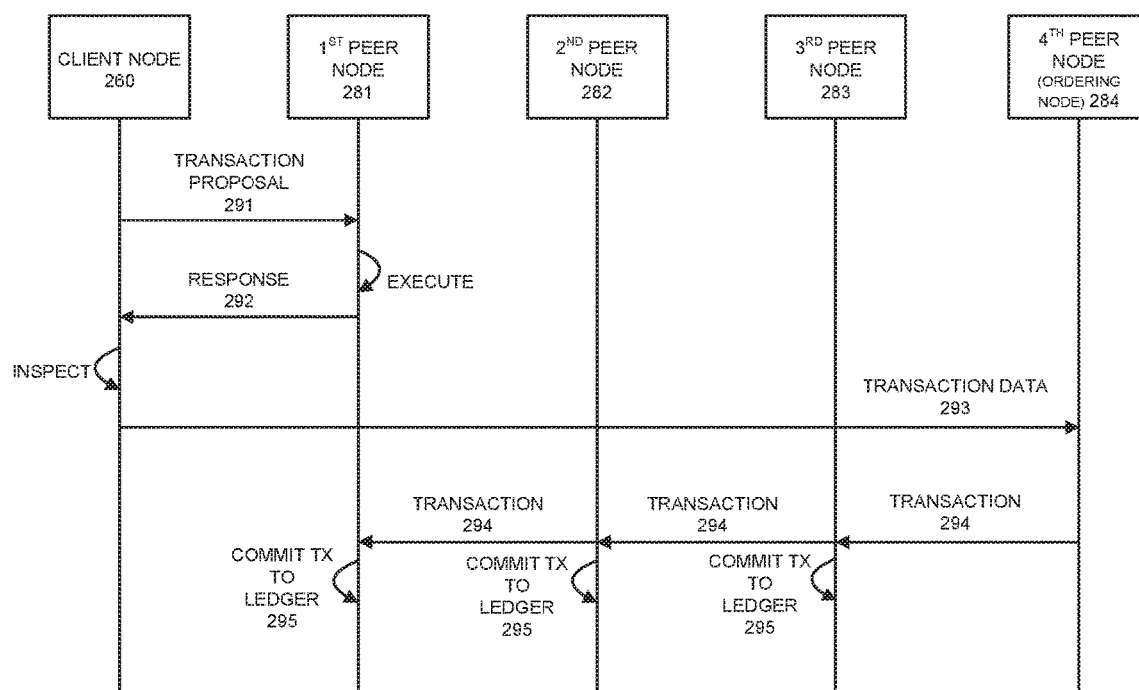
FIG. 2B illustrates a further peer node configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
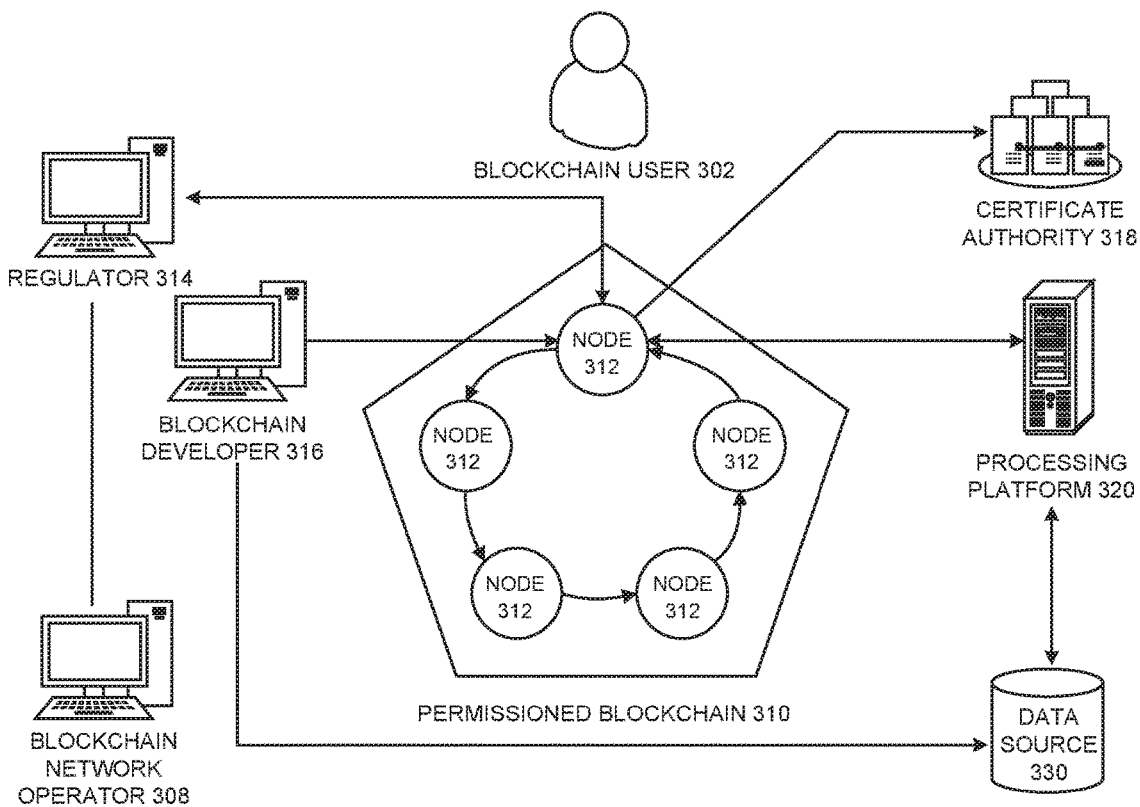
FIG. 3 illustrates a permissioned network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke, or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 314 as an "auditor" and the blockchain user 302 as a "client". An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
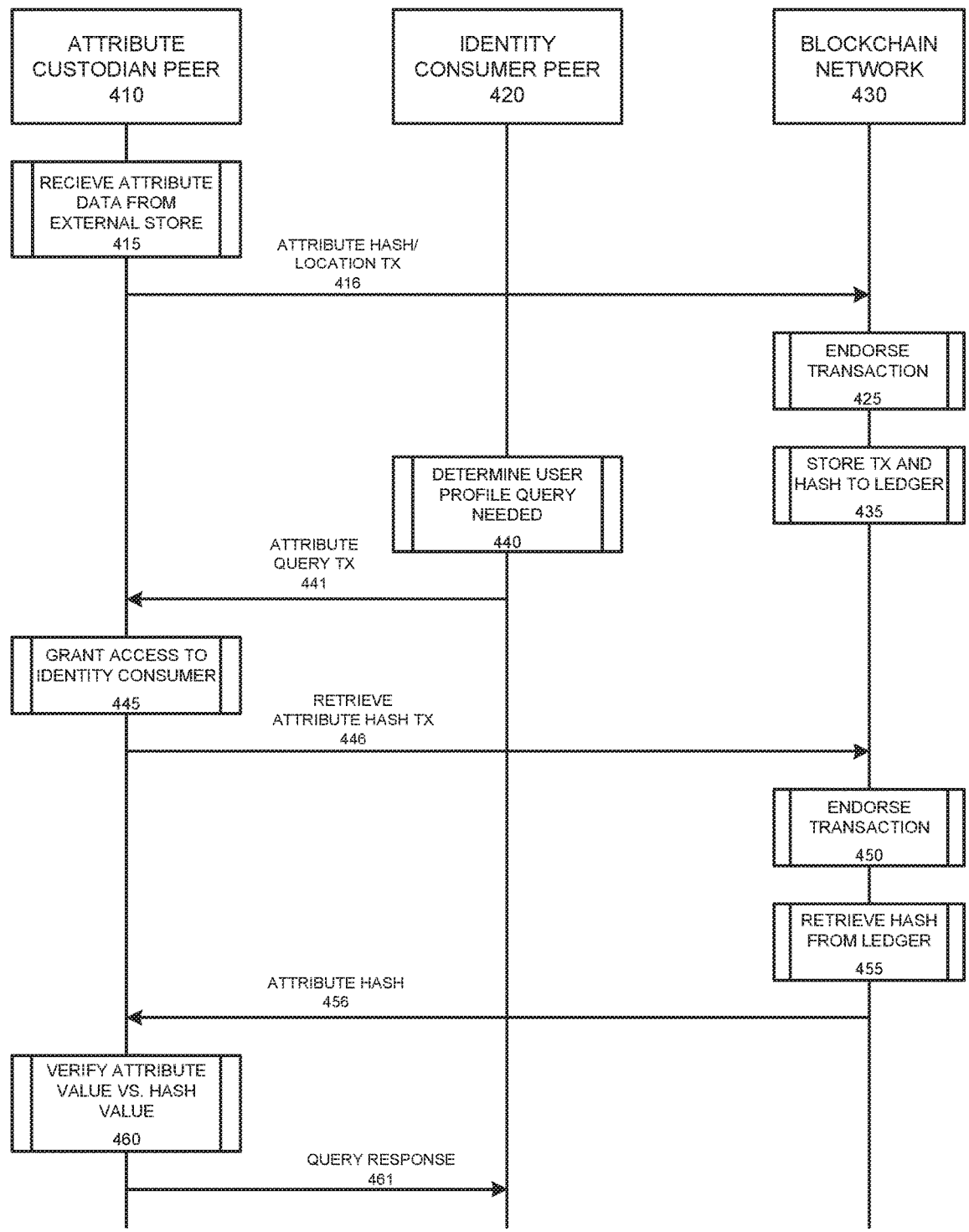
FIG. 4 illustrates a system messaging diagram for performing an identity attribute storage and retrieval process, according to example embodiments.

FIG. 4 illustrates a system messaging diagram for performing an identity attribute storage and retrieval process, according to example embodiments. Referring to FIG. 4, the system diagram 400 includes an attribute custodian peer 410, an identity consumer peer 420, and a blockchain network 430. The attribute custodian peer 410 is the owner of specific attribute data for a user profile. The same entity may have multiple roles (e.g. a bank can be an attribute custodian 410 as well as an identity consumer 420).

At block 415, the attribute custodian 410 receives attribute data 144 from an external store 136. In one embodiment, the external store 136 is outside the blockchain network. The attribute custodian 410 creates a hash of the attribute data 144, and creates a blockchain transaction 416 to store the attribute hash and metadata including an external store 136 location to the blockchain network 430.

At block 425, the blockchain network 425 endorses the transaction and in block 430 stores the transaction and hash to the shared ledger 435 as "identity transactions" 120.

Asynchronously with attribute creation and update operations, an identity consumer 420 may determine that a user profile query is required 440. For example, a loan provider (identity consumer 420) may want to view attributes of a user profile—perhaps to determine if a user qualifies for a loan. In one embodiment, the identity consumer peer 420 generates an attribute query transaction 441 to an attribute custodian peer 410. In another embodiment, the identity consumer peer 420 generates an attribute query transaction 441 to a different blockchain node or peer than the attribute custodian peer 410.

In response to receiving the attribute query transaction 441, the attribute custodian peer 410 or other blockchain node or peer grants access to the identity consumer 445, and responsively generates a retrieve attribute hash/metadata transaction 446 to the blockchain network 430.

The blockchain network 430 receives the retrieve attribute hash/metadata transaction 446 and endorses the transaction 450. The blockchain network 430 also retrieves the hash/metadata from the shared ledger 455, and provides the attribute hash 456 to the attribute custodian peer 410 or other blockchain node or peer.

The attribute custodian peer 410 receives the attribute hash 456 and verifies the attribute value compared to the attribute hash value 460. If the attribute value compares successfully to the attribute hash 456, the attribute custodian 410 or other blockchain node or peer provides a query response 461 to the requesting identity consumer peer 420 that includes one or more attributes. If the attribute value does not compare successfully to the attribute hash 456, an error notification is sent within the blockchain network 430 (as it represents that the attribute has been modified without a valid blockchain transaction).

Figure 5A:
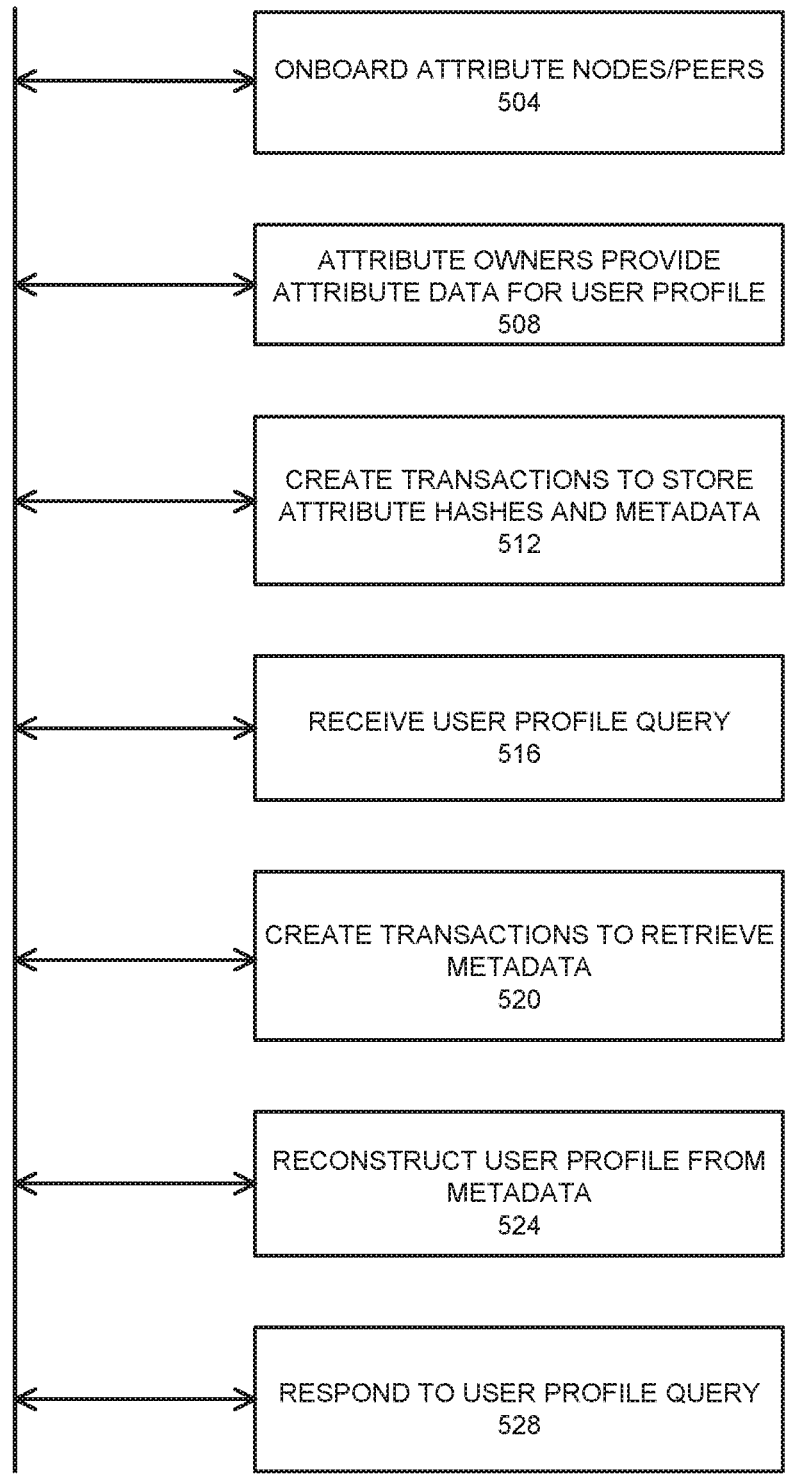
FIG. 5A illustrates a flow diagram of an example method of posting and retrieving user profile attributes in a blockchain, according to example embodiments.

FIG. 5A illustrates a flow diagram 500 of an example method of posting and retrieving user profile attributes in a blockchain, according to example embodiments. Referring to FIG. 5A, the method 500 may include one or more of the following steps.

At block 504, attribute nodes and peers are onboarded into a public or permissioned blockchain network. Setting up the blockchain network is similar to any blockchain network with a set of nodes/peers and a smart contract/chaincode. Onboarding any nodes/peers requires authentication for trust purposes.

At block 508, attribute owners provide attribute data for a user profile. A blockchain network may support any number of user profiles, and each user profile has a corresponding logical profile 112.

At block 512, attribute custodians create blockchain transactions to store attribute hashes and metadata to a shared ledger of the blockchain network.

At block 516, the blockchain network receives a user profile query from an identity consumer 124. The user profile query in most embodiments requests certain specified attributes within the user profile. In one embodiment, the user profile query requests all attributes within the user profile.

At block 520, a smart contract or chaincode of the blockchain network creates one or more blockchain transactions to retrieve metadata for the user profile query. The metadata includes locations of raw attributes 140 stored in external stores. For personal attributes contributed by a user, the corresponding raw attributes may be stored in a cloud-based storage repository such as Dropbox or Onedrive.

At block 524, the smart contract or chaincode reconstructs the user profile from the metadata. Hashes are not used to reconstruct user profiles; instead they are used to validate the attribute values. Other metadata fields, like location, are used to retrieve data to construct the user profiles.

At block 528, the smart contract or chaincode responds to the user profile query by providing the requested attributes to the requesting identity consumer.

Figure 5B:
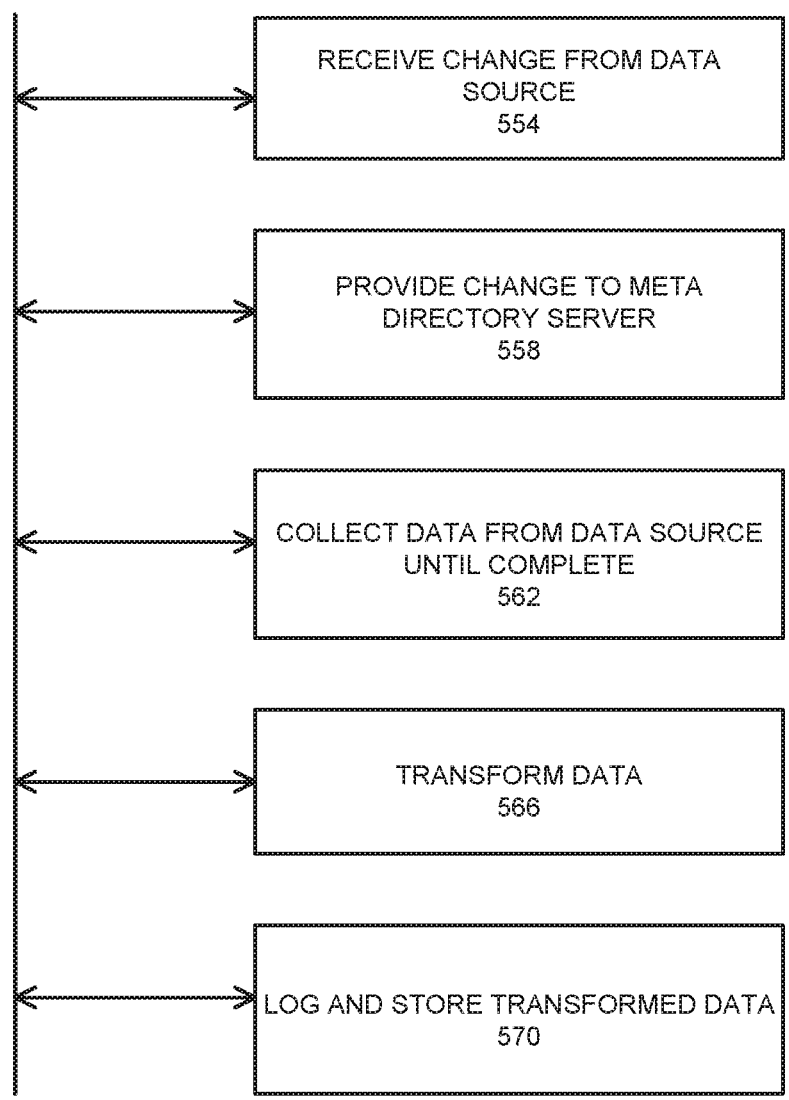
FIG. 5B illustrates a flow diagram of an example method of creating a work flow implementing consolidation operations, according to example embodiments.

FIG. 5B illustrates a flow diagram 550 of an example method of creating a work flow implementing consolidation operations, according to example embodiments. Referring to FIG. 5B, the method 550 may include one or more of the following steps.

At block 554, a meta directory server receives a change from a data source (e.g., a database server), for example, by executing a built-in task (or a portion thereof). The built-in task may poll the database server to determine the presence of the change, and retrieve the corresponding data (e.g., a row in the case of a relational database). Alternatively, a message packet indicating the change may be received automatically without polling for the change. It is assumed that the meta directory server is to consolidate data bases in database servers to generate a consolidated view.

At block 558, the received change is passed to a module in the meta directory server performing consolidation logic. The change may be passed in one of several ways, as is suitable within the architectural framework of a meta directory server. A determination is made as to whether additional data is required to process the change.

At block 562, consolidation operations generally require additional data from other data sources before generating a record for storing the consolidated view. Configuration data within the meta directory server may be examined to determine whether additional data is required. In general, the required data is determined by examining configuration data specifying the rules of the consolidation operation and the synchronization operation. The process is continued until all the necessary data is collected from the appropriate data sources.

At block 566, transformations are performed on the received/retrieved data if needed. For example, if the received data contains first name and last name fields and the database server maintains a complete name field, then a transformation is performed to concatenate both the fields to generate a complete name.

At block 570, the consolidated data is sent to the database server and the consolidated data is logged and stored in database server. It may be required to customize the tasks performed in the operation. For example, it may be required to abort the consolidation operation based on data validations (e.g., if social security number is not in the required format) for the received change in data. In some embodiments, the consolidation operation may be aborted by ignoring the change if data validations fail. In another embodiment, if the required data to be collected is not available in any data source, then it may be desirable to create the data instead of aborting the consolidation operation.

Figure 6A:
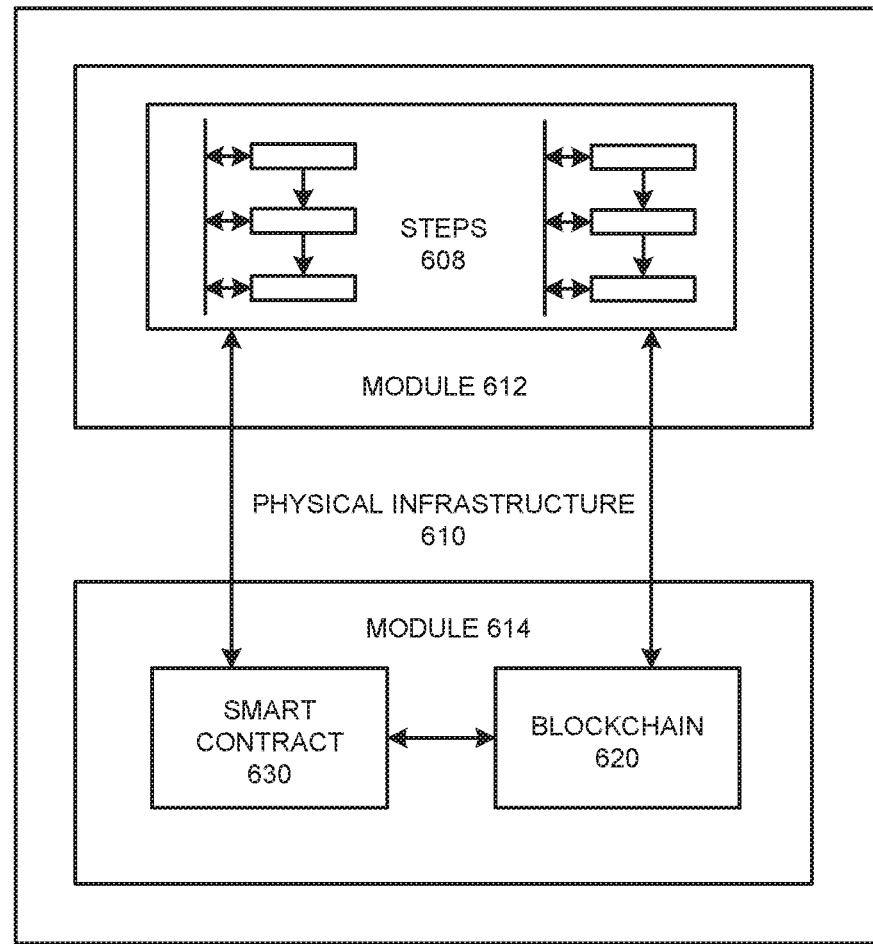
FIG. 6A illustrates an example system configured to perform one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
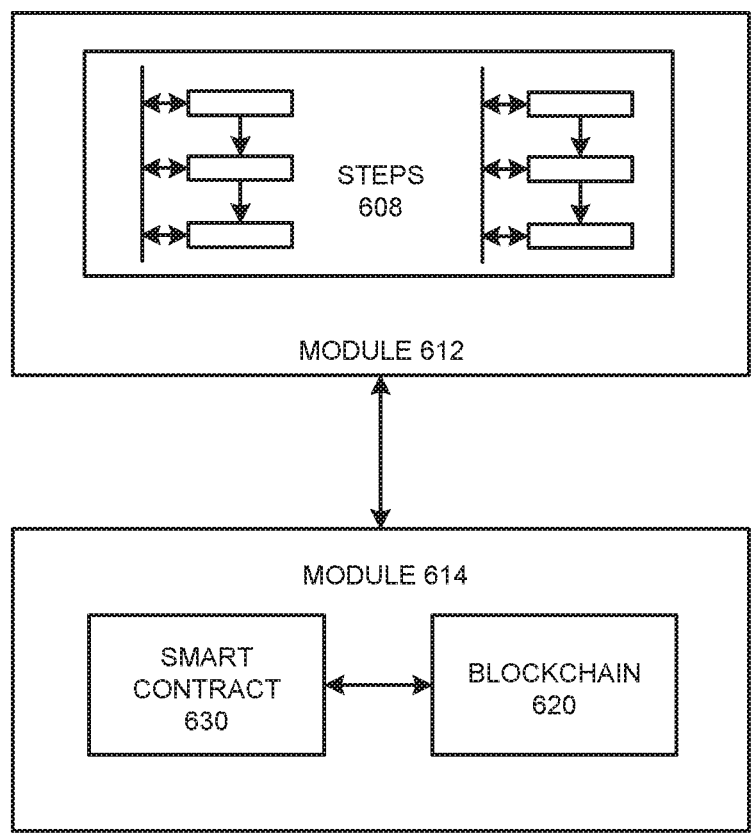
FIG. 6B illustrates a further example system configured to perform one or more operations described herein, according to example embodiments.

FIG. 6B illustrates an example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6C:
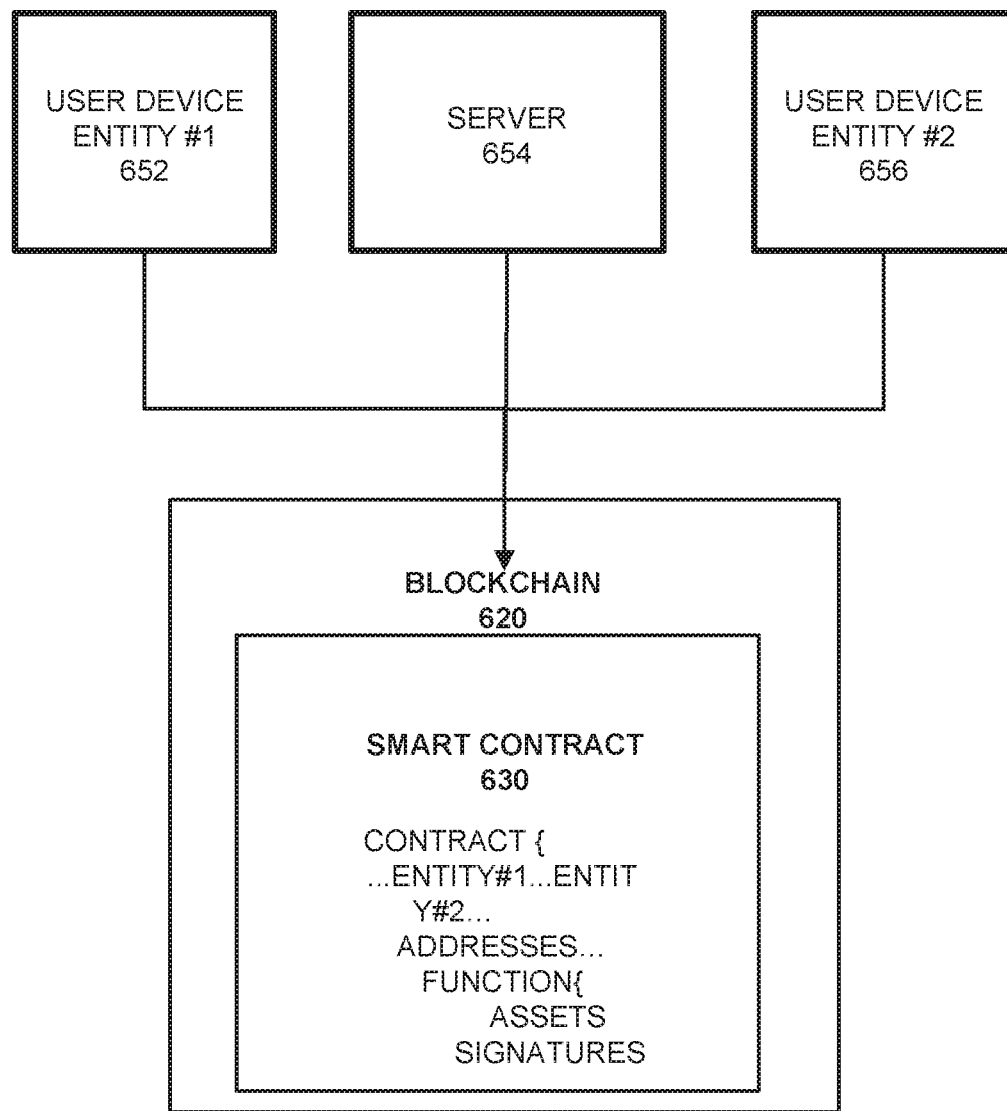
FIG. 6C illustrates a smart contract configuration among contracting parties and a mediating server configured to enforce the smart contract terms on the blockchain according to example embodiments.

FIG. 6C illustrates an example smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
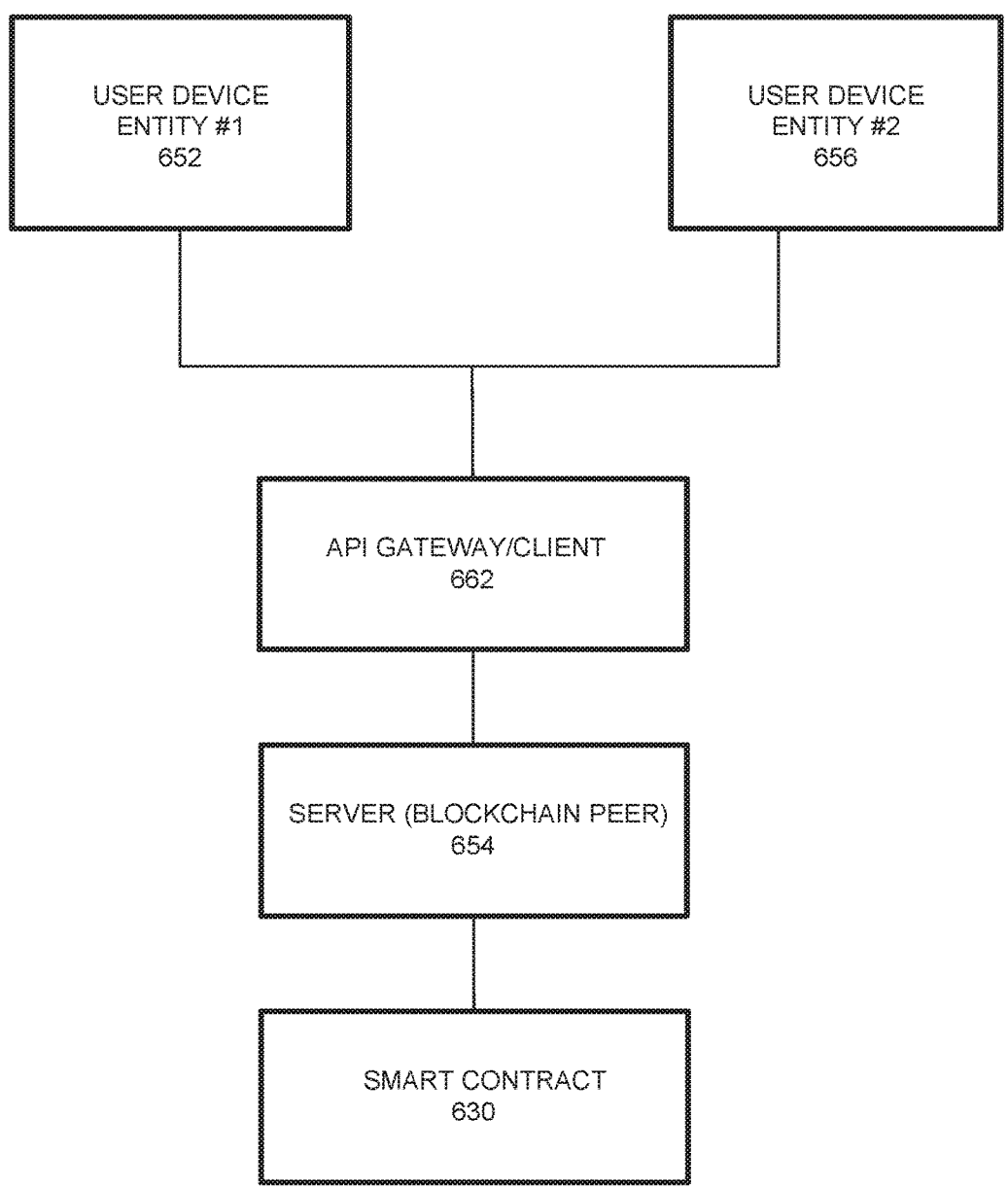
FIG. 6D illustrates an additional example system, according to example embodiments.

FIG. 6D illustrates a system 660 including a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.). In this example, the API gateway 662 is a common interface for performing transactions (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 7A:
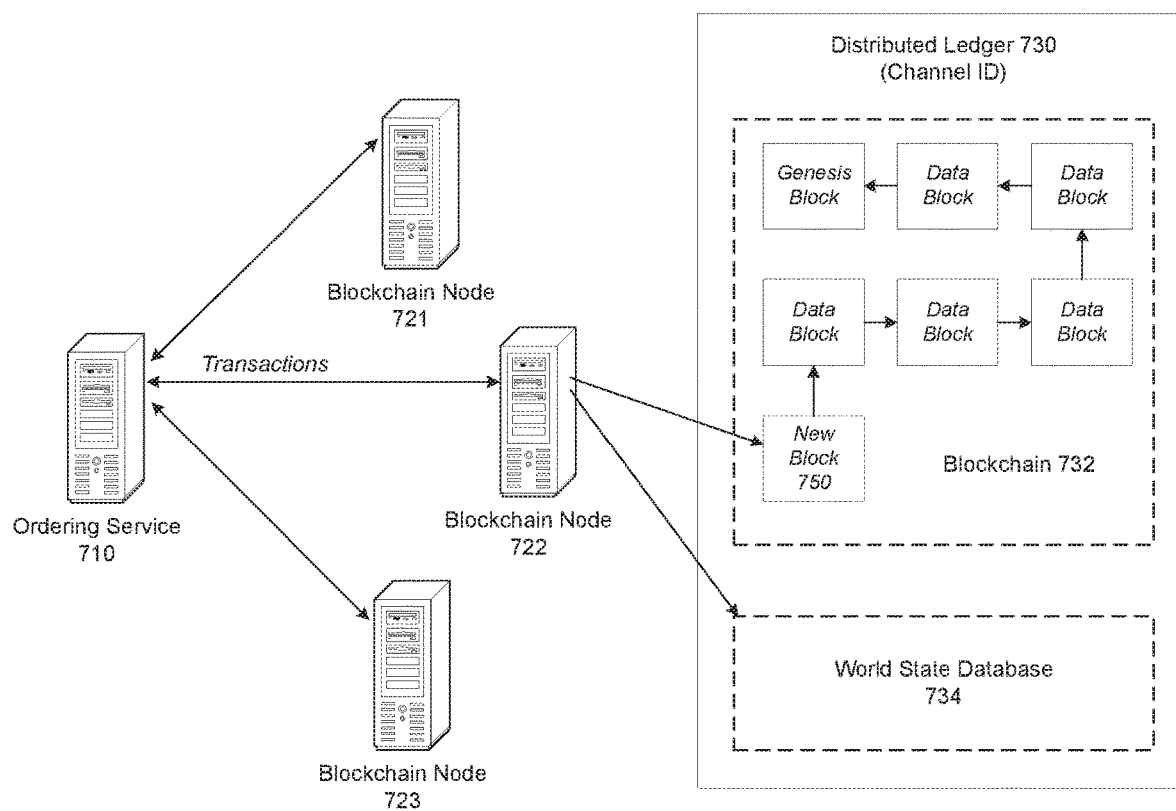
FIG. 7A illustrates a process of new data being added to a database, according to example embodiments.
Figure 7B:
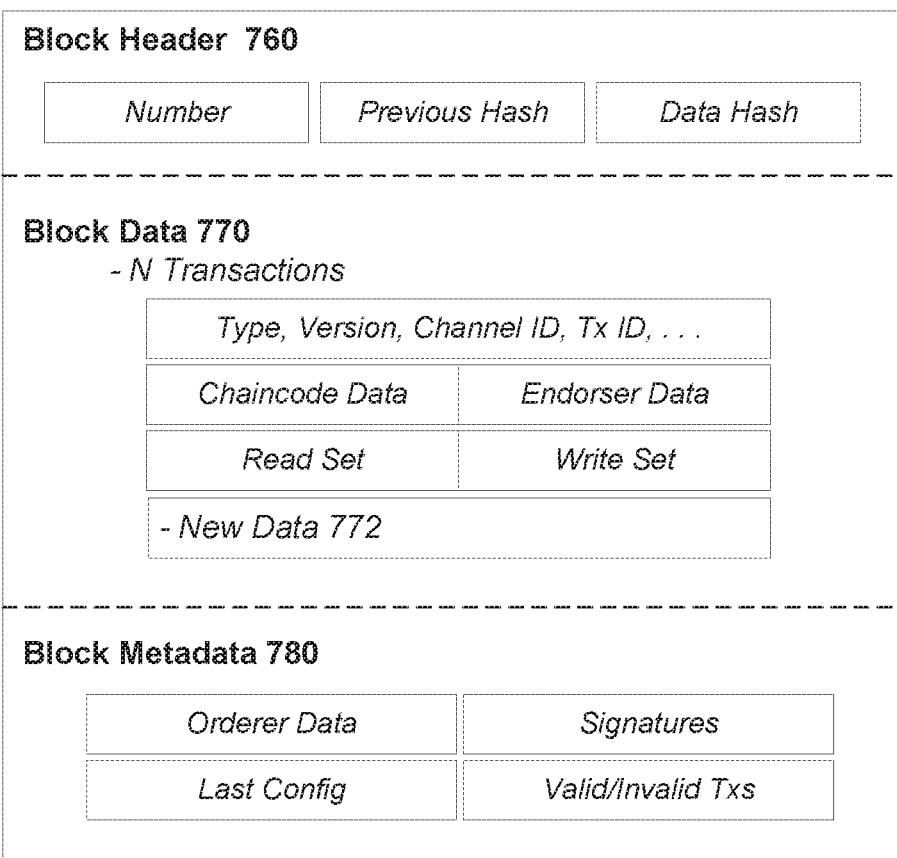
FIG. 7B illustrates contents a data block including the new data, according to example embodiments.

FIG. 7A illustrates a process 700 of a new block being added to a distributed ledger 730, according to example embodiments, and FIG. 7B illustrates contents of a block structure 750 for blockchain, according to example embodiments. Referring to FIG. 7A, clients (not shown) may submit transactions to blockchain nodes 721, 722, and/or 723. Clients may be instructions received from any source to enact activity on the blockchain 730. As an example, clients may be applications that act on behalf of a requester, such as a device, person or entity to propose transactions for the blockchain. The plurality of blockchain peers (e.g., blockchain nodes 721, 722, and 723) may maintain a state of the blockchain network and a copy of the distributed ledger 730. Different types of blockchain nodes/peers may be present in the blockchain network including endorsing peers which simulate and endorse transactions proposed by clients and committing peers which verify endorsements, validate transactions, and commit transactions to the distributed ledger 730. In this example, the blockchain nodes 721, 722, and 723 may perform the role of endorser node, committer node, or both.

The distributed ledger 730 includes a blockchain 732 which stores immutable, sequenced records in blocks, and a state database 734 (current world state) maintaining a current state of the blockchain 732. One distributed ledger 730 may exist per channel and each peer maintains its own copy of the distributed ledger 730 for each channel of which they are a member. The blockchain 732 is a transaction log, structured as hash-linked blocks where each block contains a sequence of N transactions. Blocks may include various components such as shown in FIG. 7B. The linking of the blocks (shown by arrows in FIG. 7A) may be generated by adding a hash of a prior block's header within a block header of a current block. In this way, all transactions on the blockchain 732 are sequenced and cryptographically linked together preventing tampering with blockchain data without breaking the hash links. Furthermore, because of the links, the latest block in the blockchain 732 represents every transaction that has come before it. The blockchain 732 may be stored on a peer file system (local or attached storage), which supports an append-only blockchain workload.

The current state of the blockchain 732 and the distributed ledger 732 may be stored in the state database 734. Here, the current state data represents the latest values for all keys ever included in the chain transaction log of the blockchain 732. Chaincode invocations execute transactions against the current state in the state database 734. To make these chaincode interactions extremely efficient, the latest values of all keys are stored in the state database 734. The state database 734 may include an indexed view into the transaction log of the blockchain 732, it can therefore be regenerated from the chain at any time. The state database 734 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction". Different channels may have different endorsement policies. Endorsed transactions are forward by the client application to ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 722 is a committing peer that has received a new data block 750 for storage on blockchain 730.

The ordering service 710 may be made up of a cluster of orderers. The ordering service 710 does not process transactions, smart contracts, or maintain the shared ledger. Rather, the ordering service 710 may accept the endorsed transactions and specifies the order in which those transactions are committed to the distributed ledger 730. The architecture of the blockchain network may be designed such that the specific implementation of 'ordering' (e.g., Solo, Kafka, BFT, etc.) becomes a pluggable component.

Transactions are written to the distributed ledger 730 in a consistent order. The order of transactions is established to ensure that the updates to the state database 734 are valid when they are committed to the network. Unlike a cryptocurrency blockchain system (e.g., Bitcoin, etc.) where ordering occurs through the solving of a cryptographic puzzle, or mining, in this example the parties of the distributed ledger 730 may choose the ordering mechanism that best suits that network.

When the ordering service 710 initializes a new block 750, the new block 750 may be broadcast to committing peers (e.g., blockchain nodes 721, 722, and 723). In response, each committing peer validates the transaction within the new block 750 by checking to make sure that the read set and the write set still match the current world state in the state database 734. Specifically, the committing peer can determine whether the read data that existed when the endorsers simulated the transaction is identical to the current world state in the state database 734. When the committing peer validates the transaction, the transaction is written to the blockchain 732 on the distributed ledger 730, and the state database 734 is updated with the write data from the read-write set. If a transaction fails, that is, if the committing peer finds that the read-write set does not match the current world state in the state database 734, the transaction ordered into a block will still be included in that block, but it will be marked as invalid, and the state database 734 will not be updated.

Referring to FIG. 7B, a block 750 (also referred to as a data block) that is stored on the blockchain 732 of the distributed ledger 730 may include multiple data segments such as a block header 760, block data 770, and block metadata 780. It should be appreciated that the various depicted blocks and their contents, such as block 750 and its contents. shown in FIG. 7B are merely for purposes of example and are not meant to limit the scope of the example embodiments. In some cases, both the block header 760 and the block metadata 780 may be smaller than the block data 770 which stores transaction data, however this is not a requirement. The block 750 may store transactional information of N transactions (e.g., 100, 500, 1000, 2000, 3000, etc.) within the block data 770. The block 750 may also include a link to a previous block (e.g., on the blockchain 732 in FIG. 7A) within the block header 760. In particular, the block header 760 may include a hash of a previous block's header. The block header 760 may also include a unique block number, a hash of the block data 770 of the current block 750, and the like. The block number of the block 750 may be unique and assigned in an incremental/sequential order starting from zero. The first block in the blockchain may be referred to as a genesis block which includes information about the blockchain, its members, the data stored therein, etc.

The block data 770 may store transactional information of each transaction that is recorded within the block 750. For example, the transaction data may include one or more of a type of the transaction, a version, a timestamp, a channel ID of the distributed ledger 730, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, attribute data, attribute metadata, a location of the raw attribute data, and various forms of owner contact information, and the like. The transaction data may be stored for each of the N transactions.

In some embodiments, the block data 770 may also store data 772 which adds additional information to the hash-linked chain of blocks in the blockchain 732. Accordingly, the data 772 can be stored in an immutable log of blocks on the distributed ledger 730. Some of the benefits of storing such data 772 are reflected in the various embodiments disclosed and depicted herein.

The block metadata 780 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committer of the block (such as blockchain node 722) may add validity/invalidity information based on an endorsement policy, verification of read/write sets, and the like. The transaction filter may include a byte array of a size equal to the number of transactions in the block data 770 and a validation code identifying whether a transaction was valid/invalid.

Figure 8:
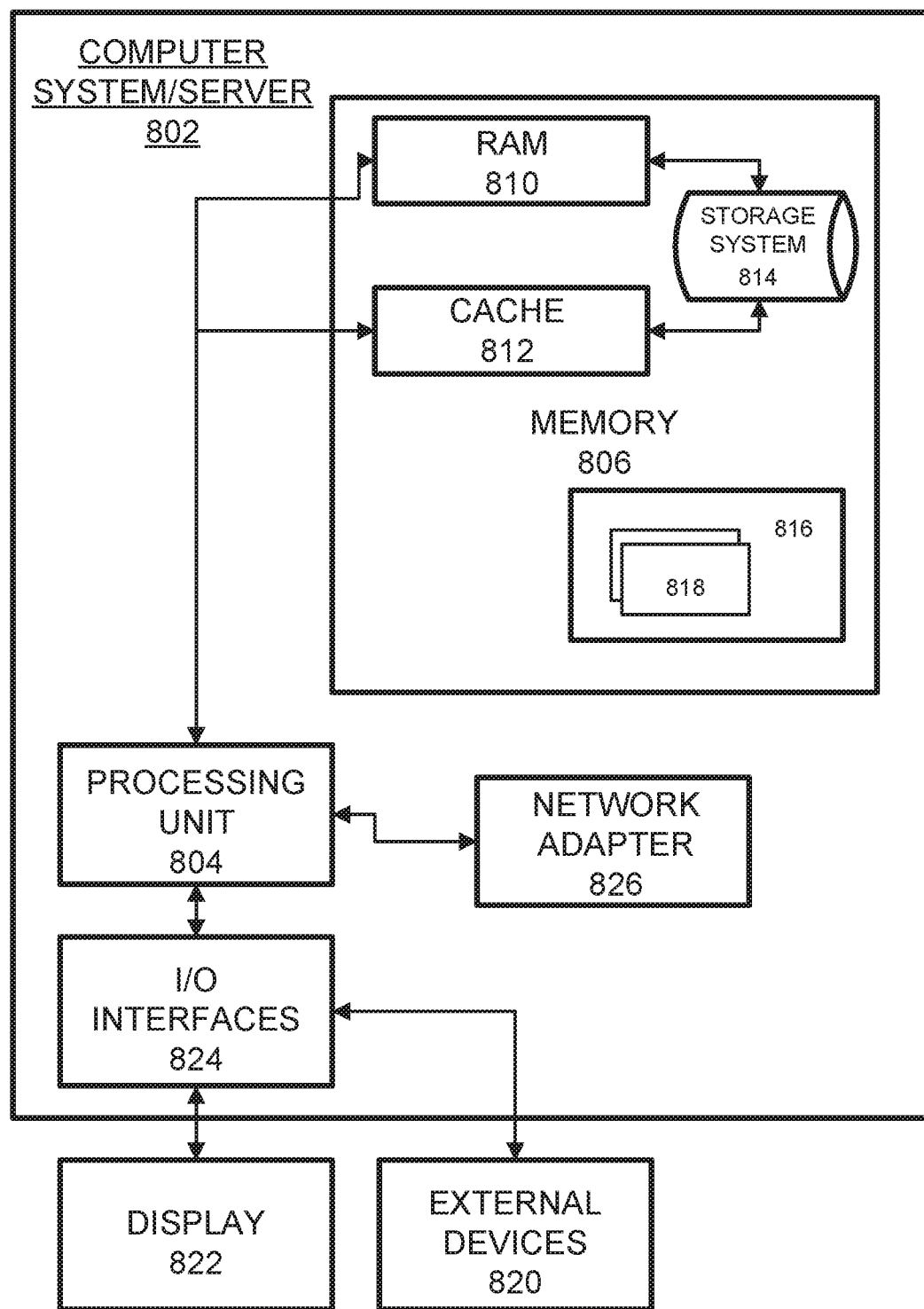
FIG. 8 illustrates an example system that supports one or more of the example embodiments.

FIG. 8 is not intended to suggest any limitation as to the scope of use or functionality of embodiments of the application described herein. Regardless, the computing node 800 is capable of being implemented and/or performing any of the functionality set forth hereinabove.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. An attribute custodian in blockchain network including an identify consumer and a shared ledger, the attribute custodian comprising:
   a memory configured to store one or more instructions; and
   a processor that when executing the one or more instructions is configured to:
      receive attribute data associated with an attribute in a user profile of a user from a data store external to the blockchain network;
      create a blockchain transaction to store metadata to the shared ledger, the metadata including a hash of the attribute data and non-hashed data;
      grant access to the identity consumer in response to a query to the attribute custodian the user profile;
      send, based on a smart contract, a transaction to the shared ledger to retrieve the metadata in response to the query;
      retrieve the metadata in response to the transaction;
      reconstruct, based on the smart contract, the user profile from the non-hashed data of the metadata; and
      send, based on the smart contract, the attribute data to the identity consumer in response to the query.

2. The attribute custodian of claim 1, wherein the metadata comprises a location of the attribute data in the data store.

3. The attribute custodian of claim 2, wherein, when the attribute custodian is configured to reconstruct the user profile, the attribute custodian is configured to:
   retrieve the attribute data from the storage location; and
   validate the attribute data with the hash of the attribute data.

4. The attribute custodian of claim 1, wherein the shared ledger comprises a logical view of the profile and manages the logical view through one or more application programming interfaces.

5. The attribute custodian of claim 4, wherein the attribute custodian is further configured to:
   modify metadata in the shared ledger via an application programming interface call to the smart contract.

6. The attribute custodian of claim 1, wherein, when the attribute custodian is configured to receive the attribute data, the attribute custodian is further configured to:
   approve inclusion of the attribute data to the user profile based on a policy associated with the user; and
   select the data store.

7. A method, comprising:
   receiving, by a blockchain node of a blockchain network including an identify consumer and a shared ledger, attribute data associated with an attribute in a profile of a user from a data store external to the blockchain network;
   creating, by the blockchain node, a blockchain transaction to store metadata to the shared ledger, the metadata including a hash of the attribute data and non-hashed data;
   granting, by the blockchain node, access to the identity consumer in response to a query regarding the profile;
   retrieving, by the blockchain node, the metadata from the shared ledger in response to a transaction sent to the shared ledger in response to the query;
   reconstructing, by the blockchain node, the user profile from the non-hashed data of the metadata; and
   sending, by the blockchain node, the attribute data to the identity consumer in response to the query.

8. The method of claim 7, wherein the metadata comprises a location for storing the attribute data in the data store.

9. The method of claim 8, wherein the reconstructing the user profile from the metadata comprises:
   retrieving the attribute data corresponding to the user profile from the storage location; and
   validating attribute data with the hash of the attribute data.

10. The method of claim 7, wherein the shared ledger comprises a logical view of the profile and manages the logical view through one or more application programming interfaces.

11. The method of claim 10, further comprising:
    modifying metadata in the shared ledger via an application programming interface call to the smart contract.

12. The method of claim 7, wherein the receiving the attribute data further comprises:
    approving inclusion of the attribute data to the user profile based on a policy associated with the user; and
    selecting the data store.

13. A non-transitory computer readable medium configured to store one or more instructions that when executed by a processor of a blockchain node of a blockchain network including an identify consumer and a shared ledger causes the processor to perform:
    receiving attribute data associated with an attribute in a profile of a user from a data store external to the blockchain network;
    creating a blockchain transaction to store metadata to the shared ledger, the metadata including a hash of the attribute data and non-hashed data;
    granting access to the identity consumer in response to a query regarding the profile;
    retrieving the metadata from the shared ledger in response to a transaction sent to the shared ledger in response to the query;
    reconstructing the user profile from the non-hashed data of the metadata; and
    sending the attribute data to the identity consumer in response to the query.

14. The non-transitory computer readable medium of claim 13, wherein the metadata comprises a location for storing the attribute data in the data store, and
    wherein, when the processor is configured to perform the reconstructing the user profile, the processor is further configured to perform:
      retrieving the attribute data corresponding to the user profile from the storage location; and
      validating attribute data with the hash of the attribute data.

15. The non-transitory computer readable medium of claim 13, wherein the shared ledger comprises a logical view of the profile and manages the logical view through one or more application programming interfaces.

16. The non-transitory computer readable medium of claim 15, wherein the one or more instructions further configure the processor to perform:
    modifying metadata in the shared ledger via an application programming interface call to the smart contract.

17. The non-transitory computer readable medium of claim 13, wherein, when the processor is configured to perform the receiving the attribute data for the user profile, the processor is further configured to perform:
    approving inclusion of the attribute data to the user profile based on a policy associated with the user; and
    selecting the data store.

* * * * *